US008918887B2

(12) United States Patent
Taniguchi et al.

(10) Patent No.: US 8,918,887 B2
(45) Date of Patent: Dec. 23, 2014

(54) VULNERABILITY-DIAGNOSIS DEVICE

(75) Inventors: Tomohiro Taniguchi, Kyoto (JP);
Hideyuki Majima, Kyoto (JP);
Takahiro Tokue, Kanagawa (JP);
Takashi Ohkusa, Kyoto (JP); Masashi Tabata, Kyoto (JP); Shintaro Ueda, Kyoto (JP)

(73) Assignee: Kyocera Communication Systems, Co., Ltd., Kyoto (JP)

( * ) Notice: Subject to any disclaimer, the term of this patent is extended or adjusted under 35 U.S.C. 154(b) by 27 days.

(21) Appl. No.: 13/884,444

(22) PCT Filed: Nov. 10, 2011

(86) PCT No.: PCT/JP2011/006296
§ 371 (c)(1),
(2), (4) Date: May 9, 2013

(87) PCT Pub. No.: WO2012/063493
PCT Pub. Date: May 18, 2012

(65) Prior Publication Data
US 2013/0227698 A1      Aug. 29, 2013

(30) Foreign Application Priority Data
Nov. 10, 2010   (JP) .................................. 2010-251423

(51) Int. Cl.
G06F 21/00      (2013.01)
H04L 29/06      (2006.01)
G06F 21/55      (2013.01)
G06F 21/62      (2013.01)
G06F 21/57      (2013.01)

(52) U.S. Cl.
CPC .......... *H04L 63/1433* (2013.01); *G06F 21/554* (2013.01); *G06F 21/6227* (2013.01); *G06F 21/577* (2013.01)
USPC ......................................................... 726/25

(58) Field of Classification Search
CPC combination set(s) only.
See application file for complete search history.

(56) References Cited

U.S. PATENT DOCUMENTS 7,860,842 B2 * 12/2010 Bronnikov et al. ........... 707/690
2005/0273854 A1 * 12/2005 Chess et al. ..................... 726/22
(Continued)

FOREIGN PATENT DOCUMENTS

JP   2006-338246   12/2006
JP   2008-165292   7/2008
(Continued)

OTHER PUBLICATIONS

Notification of Reasons for Refusal for corresponding Japanese Application No. 2010-251423, mailed Oct. 28, 2013.
(Continued)

*Primary Examiner* — Beemnet Dada
(74) *Attorney, Agent, or Firm* — Jason H. Vick; Sheridan Ross, PC

(57) ABSTRACT

To diagnose vulnerabilities such as SQL injection, even for web-server devices that change the content of responses to requests in accordance with prescribed conditions. A normal-response collection means (10) transmits a normal request (REQN), accompanied by a registered user ID and password, a plurality of times. Said normal-response collection means (10) receives a plurality of responses (RESN) (hereafter "normal responses") from a web server in response to the normal requests. A common-region extraction means (12) extracts a common region from the plurality of normal responses. An abnormal-response collection means (18) performs SQL injection on the web server, receives the response (RESA) (hereafter "abnormal response"), and records same in a storage unit (16). A determination means (14) determines that the web server has a vulnerability if the normal responses and the abnormal response are the same in the common region.

6 Claims, 16 Drawing Sheets

(56) References Cited

U.S. PATENT DOCUMENTS

| | | | |
|---|---|---|---|
| 2009/0119777 A1* | 5/2009 | Jeon | 726/25 |
| 2012/0222123 A1* | 8/2012 | Williams et al. | 726/25 |
| 2013/0133075 A1* | 5/2013 | Abadi et al. | 726/25 |

FOREIGN PATENT DOCUMENTS

| | | |
|---|---|---|
| JP | 2008-299540 | 12/2008 |
| JP | 2009-294004 | 12/2009 |

OTHER PUBLICATIONS

International Preliminary Report on Patentability (including translation) for International Application No. PCT/JP2011/006296, mailed May 23, 2013.

Tokumaru, Hiroshi et al., "Perfect Protection of Web Application Security to Prevent Unauthorized Access and Information Leakage" Nikkei Business Publications, Inc., Nov. 2004 (including English translation).

Imagawa, Daisuke et al. "Cloud Computing Technologies for Enterprise Information Systems" Mitsubishi Denki Giho, vol. 84, No. 7, Jul. 25, 2010 pp. 31-34.

Kawauchi, Kiyoto et al. "A Web Page Change Detection Method by Analyzing Tag Appearance Order" Computer Security Symposium 2005 Ronbunshu, vol. II of II Computer Security Symposium 2005 (CCSS2005), Oct. 26, 2005, vol. 2005, pp. 505-510; Includes English translation of Abstract.

Tokumaru, Hiroshi et al., "Perfect Protection of Web Application Security to Prevent Unauthorized Access and Information Leakage" Nikkei Business Publications, Inc., Nov. 2004.

International Search Report for International Application No. PCT/JP2011/006296, mailed Dec. 13, 2011.

Notification of Reasons for Refusal for corresponding Japanese Application No. 2010-251423, mailed Dec. 12, 2011.

Decision of Refusal for corresponding Japanese Application No. 2010-251423, mailed Mar. 5, 2012.

* cited by examiner

FIG.9

RESN1

```
<HTML>
<HEAD>
<Title>WELCOME</Title>
</HEAD>
<BODY>
<a href="http://www.abc.co.jp/shokuhin">FOOD</a><BR>
<a href="http://www.abc.co.jp/fashon">FASHION</a><BR>
<a href="http://www.abc.co.jp/travel">TRAVEL</a><BR>
LOGIN TIME<BR>
```
TM1 — ( 13:15:45<BR> )
AD1 — ( <img src="http://www.xyz.co.jp"><BR> )
```
</BODY>
```

RESN2

```
<HTML>
<HEAD>
<Title>WELCOME</Title>
</HEAD>
<BODY>
<a href="http://www.abc.co.jp/shokuhin">FOOD</a><BR>
<a href="http://www.abc.co.jp/fashon">FASHION</a><BR>
<a href="http://www.abc.co.jp/travel">TRAVEL</a><BR>
LOGIN TIME<BR>
```
TM2 — ( 13:17:45<BR> )
AD2 — ( <img src="http://www.pqr.co.jp"><BR> )
```
</BODY>
```

FIG.10
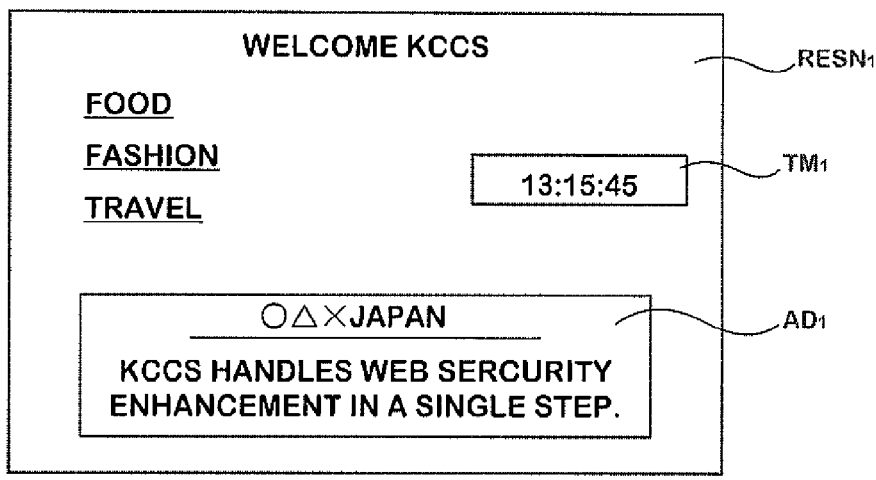
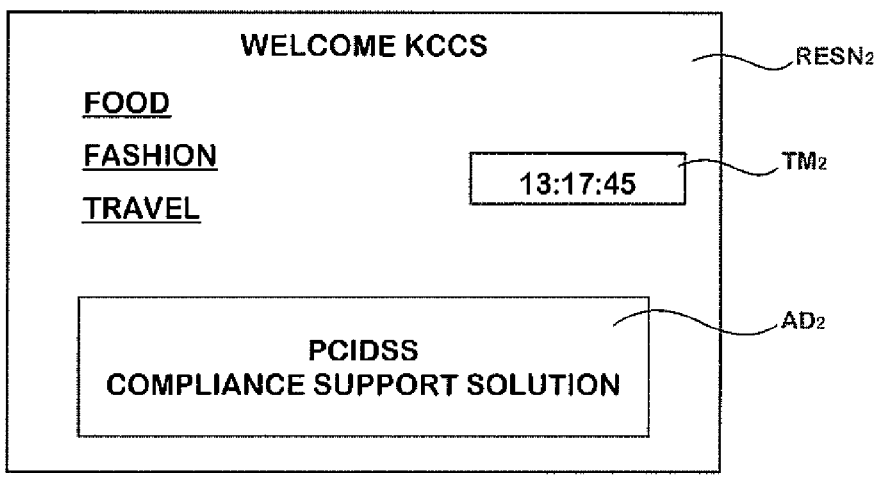
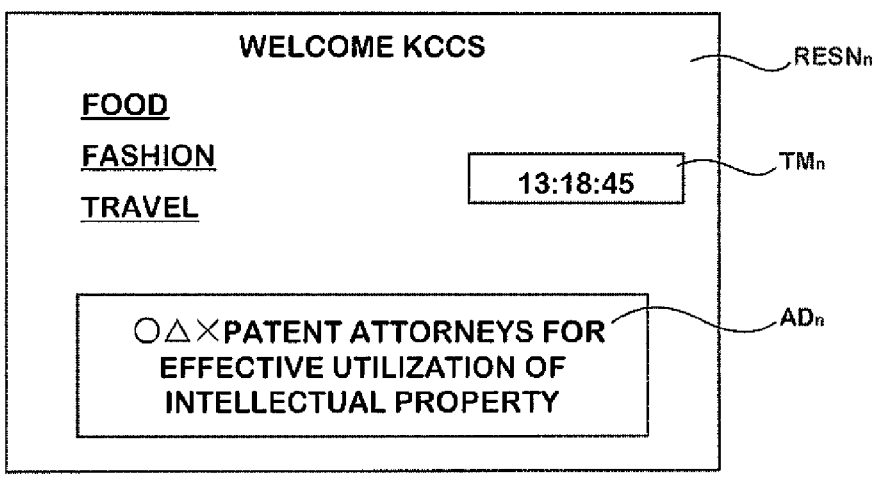

FIG.11

RESA

```
<HTML>
<HEAD>
<Title>ERROR</Title>
</HEAD>
<BODY>
INCORRECT USER ID OR PASSWORD
<a href"http://www.abc.co.jp/>RETURN TO LOG IN SCREEN</a>
</BODY>
```

RESA

```
<HTML>
<HEAD>
<Title>WELCOME</Title>
</HEAD>
<BODY>
<a href="http://www.abc.co.jp/shokuhin">FOOD</a><BR>
<a href="http://www.abc.co.jp/fashon">FASHION</a><BR>
<a href="http://www.abc.co.jp/travel">TRAVEL</a><BR>
LOGIN TIME<BR>
13:20:45<BR>
<img src="http://www.lmn.co.jp"><BR>
</BODY>
```

FIG.13

COMMON AREA

```
<HTML>
<HEAD>
<Title>WELCOME</Title>
</HEAD>
<BODY>
<a href="http://www.abc.co.jp/shokuhin">FOOD</a><BR>
<a href="http://www.abc.co.jp/fashon">FASHION</a><BR>
<a href="http://www.abc.co.jp/travel">TRAVEL</a><BR>
LOGIN TIME<BR>
*******<BR>
*******<BR>
</BODY>
```

FIG.14A

```
<HTML>
<HEAD>
<Title>ERROR</Title>
</HEAD>
<BODY>
INCORRECT USER ID OR PASSWORD
<a href"http://www.abc.co.jp/>RETURN TO LOG IN SCREEN</a>
</BODY>
```

FIG.14B

```
<HTML>
<HEAD>
<Title>WELCOME</Title>
</HEAD>
<BODY>
<a href="http://www.abc.co.jp/shokuhin">FOOD</a><BR>
<a href="http://www.abc.co.jp/fashon">FASHION</a><BR>
<a href="http://www.abc.co.jp/travel">TRAVEL</a><BR>
LOGIN TIME<BR>
*******<BR>
*******<BR>
</BODY>
```

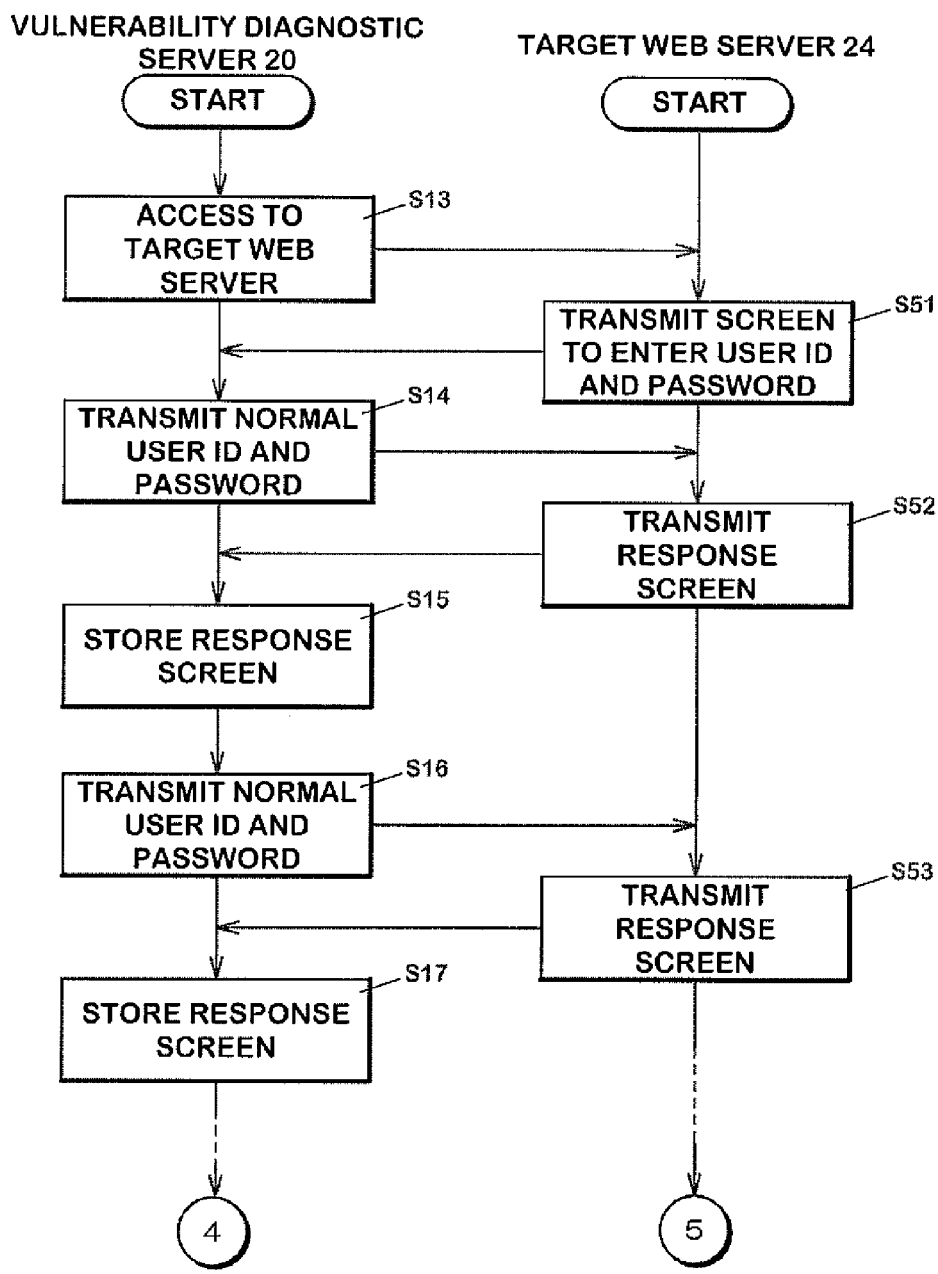

VULNERABILITY-DIAGNOSIS DEVICE

CROSS REFERENCE TO RELATED APPLICATIONS

This application is a national stage application under 35 U.S.C. 371 of PCT Application No. PCT/JP2011/006296 having an international filing date of 10 Nov. 2011, which designated the United States, which PCT application claimed the benefit of Japanese Application No. 2010-251423 filed 10 Nov. 2010, each of which are incorporated herein by reference in their entirety.

TECHNICAL FIELD

The present invention relates to a vulnerability diagnostic device that diagnoses the vulnerability of websites.

BACKGROUND ART

An SQL injection is one method of attacks on Web servers. This is performed by using SQL for manipulating a database to illegally manipulate the database on a Web server.

As one example, a system shown in FIG. 1 will be described. Assume that a Web server 4 is provided with a login screen as shown in FIG. 2. On a terminal PC 2, a user inputs an own user ID and a password and submits them to the Web server (see numeral (1) of FIG. 1). The Web server 4 stores a record of a combination of the user ID and the password on a database 6 in advance. If the combination of the user ID and the password transmitted from the terminal PC 2 be matched with the record, the Web server 4 permits the user to access and transmits a next screen (see (3) to (6) of FIG. 1).

If there be no record matched with the combination of the user ID and the password transmitted from the terminal PC 2, the Web server transmits a screen indicating that the access is denied (see (3) to (6)).

As described above, unless the user correctly inputs the user ID and the password, the Web server does not give the user permission to access. Accordingly, an access authorization to the Web server is controlled.

In processing described above, the Web server 4 generates an SQL statement for searching the database based on the user ID and the password received from the terminal PC 2 (see (2)). Assume that the user enters input according to the screen shown in FIG. 2 and a user ID (uid) and a password (pwd) are respectively transmitted as "furutani" and "1cd45" from the terminal PC 2. The Web server 4 receives the user ID and the password, adds character strings in accordance with the following rule, and generates the SQL statement.

SELECT * FROM user WHERE uid='user ID' AND pwd='password' According to the above rule, the following SQL statement is generated when the user ID (uid) is "furutani" and the password (pwd) is "1cd45".

SELECT * FROM user WHERE uid='furutani' AND pwd='1cd45' The Web server 4 provides the SQL statement to a database 6 (see (3)) and retrieves a determination result from the database 6 whether the user whose user ID (uid) is "furutani" and password (pwd) is "1cd45" is registered on the record or not (see (4)). In other words, when the user whose user ID (uid) is "furutani" and password (pwd) is "1cd45" is registered on the record, the logical value of "uid='furutani' AND pwd='1 cd45'" becomes "1", and the logical value becomes "0" when the user is not registered.

The Web server 4 accepts user privileges and permits the user to access when the logical value "1" is returned, and determines that the user is unauthorized and denies the access of the user when the logical value "0" is returned (see (5), (6)).

However, if an algorithm for generating the SQL statement as described above can be speculated, there is a possibility that an attack (SQL injection) as follows is performed.

An attacker enters a random name as the user ID (uid) from the terminal PC2. For example, the attacker inputs "ueno". The following input is entered as the password (pwd).

'OR 'A'='A

According to the algorithm described above, the following SQL statement is generated for such input.

SELECT * FROM user WHERE uid='ueno' AND pwd=''OR 'A'='A' In this SQL statement, the logical value of the part of "uid='ueno' AND pwd=''" usually becomes zero (the expression "pwd=''" means that the password is a null string). However, there is an expression "OR 'A'='A'", the logical value of the expression "'A'='A'" always becomes "1", and the expressions are combined by using an "OR" operator; therefore, the logical value always becomes "1" as a whole.

Accordingly, when the input as described above is entered, the logical value always becomes "1", and even the user who does not have the password can illegally make access.

Thus, measures against such SQL injections are taken on the Web server 4 to reject the SQL injection to prevent unauthorized access. There are several types of SQL injection, and the Web server is not completely secured unless the measures against all types of SQL injection are taken.

Therefore, a diagnosis of the Web server 4 is performed whether the server has the vulnerability to such SQL injection or not (see Non-Patent Document 1). The diagnosis is achieved by a method as follows.

First, the access to the Web server to be diagnosed is made with a correct user ID and a password. The response to the normal access from the Web server is recorded as a normal response. In this case, the normal response includes the details shown as a result of permitting the access.

Next, the access by SQL injection (referred to as abnormal access) is made. The response to the abnormal access from the Web server is recorded as an abnormal response. When the Web server device does not permit access against an attack with SQL injection, the abnormal response includes the details shown as a result of not permitting the access (for example, an error screen and the like). In other words, when there is no vulnerability to SQL injection, the details of the normal response differ from those of the abnormal response.

On the other hand, if the Web server has the vulnerability to SQL injection attacks which the server permits access, the abnormal response becomes the same as the normal response.

As described above, the vulnerability to SQL injection can be determined by a comparison in which the response to the normal access is the same as or differs from the response to the abnormal access. According to the aforementioned method, the diagnosis can be performed by means of determination whether the normal response is the same as the abnormal response or not without determination of contents of the response by a human, and therefore the automation of the diagnosis can be achieved.

RELATED ART DOCUMENT

Non-Patent Document

Non-Patent Document 1: "Perfect Protection of Web Application Security to Prevent Unauthorized Access and Information Leakage" by Hiroshi Tokumaru et al., Nikkei Business Publications, Inc., November 2004.

SUMMARY OF THE INVENTION

Problem to be Solved by the Invention

However, the aforementioned diagnostic technique had a following disadvantage. As described above, when the Web server has the vulnerability to SQL injection, the response to the normal request becomes the same as the response to the abnormal request, and thus the vulnerability can be found.

However, when the Web server to be diagnosed changes the contents of the response to the normal request with time or the number of access (an advertisement, a time display on a clock, or the like changes with each access), the normal response does not become identical with the abnormal response even if the server has the vulnerability to SQL injection. Therefore, there has been a disadvantage of such a Web server in which the vulnerability to SQL injection cannot be diagnosed correctly.

In addition, such a disadvantage is common to the vulnerability not only to SQL injection but also of which the diagnosis can be performed by means of uniformity of the normal response and the abnormal response.

It is therefore an object of the present invention to provide a diagnostic device that can correctly diagnose the vulnerability to SQL injection even with regard to a Web server which changes the contents of a response to a normal request according to predetermined conditions.

Means for Solving the Problem (1)(2) The vulnerability diagnostic device according to the present invention is a vulnerability diagnostic device for diagnosing whether a Web server has vulnerability to an attack or not and includes: a normal response collection means for transmitting a plurality of normal requests to a diagnosis target Web server and receiving a plurality of normal responses in response to each normal request to store it in a recording section; a common area extraction means for extracting a common area where contents among the plurality of normal responses have no variation according to the plurality of normal responses stored in the recording section; an abnormal response collection means for transmitting an abnormal request to the diagnosis target Web server and receiving an abnormal response in response to the abnormal request to store it in the recording section; and a determination means for comparing contents of the normal response with contents of the abnormal response in the common area, determining whether there is a difference between the responses or not, and determining absence of vulnerability when there is the difference or presence of vulnerability when there is not the difference.

Therefore, the vulnerability diagnosis to the abnormal request can be performed even for the Web server which has a part changing the contents of the response according to the timing and the number of request.

(3) The vulnerability diagnostic program according to the present invention is characterized in that the abnormal request is a request for performing SQL injection.

Therefore, the vulnerability diagnosis to the SQL injection can be performed.

(4) The vulnerability diagnostic device realized by the vulnerability diagnostic program according to the present invention is characterized by being configured as a server device, and in that the normal response collection means collects the normal responses according to a URL of the diagnosis target Web server and information regarding the normal requests transmitted from a terminal device through a network.

Therefore, the vulnerability diagnosis can be performed even though the user does not have the vulnerability diagnostic program.

(5) The vulnerability diagnostic program according to the present invention is a vulnerability diagnostic method of executing a vulnerability diagnostic device for diagnosing whether a Web server has vulnerability to an attack or not by a computer, and characterized by: transmitting a plurality of normal requests to a diagnosis target Web server and receiving a plurality of normal responses in response to each normal request to store it in a recording section; extracting a common area where contents among the plurality of normal responses have no variation according to the plurality of normal responses stored in the recording section; transmitting an abnormal request to the diagnosis target Web server and receiving an abnormal response in response to the abnormal request to store it in the recording section; and comparing contents of the normal response with contents of the abnormal response in the common area, determining whether there is a difference between the responses or not, and determining absence of vulnerability when there is the difference or presence of vulnerability when there is not the difference.

Therefore, the vulnerability diagnosis to the abnormal request can be performed even for the Web server which has a part changing the contents of the response according to the timing and the number of request.

The "normal response collection means" corresponds, in embodiments, to steps S14 and S15 or steps S16 and S17 of FIG. 6 and FIG. 15.

The "common area extraction means" corresponds, in the embodiments, to a step S20 of FIG. 7 and FIG. 16.

The "abnormal response collection means" corresponds, in the embodiments, to steps S18 and S19 of FIG. 7 and FIG. 16.

The "determination means" corresponds to steps S22, S23, and S24 of FIG. 7 and FIG. 16.

The "program" is a concept that includes not only a program directly executable by a CPU but also the source form of a program, a compressed program, an encrypted program, and the like.

BRIEF DESCRIPTION OF THE DRAWINGS

FIG. 9 is a diagram that shows the data of normal responses RESN1 and RESN2;

FIG. 10 shows screen displays corresponding to the data of the normal responses RESN1 and RESN2 of FIG. 9;

FIG. 11 is diagrams that show the data of an abnormal response RESA;

FIG. 13 is a diagram that shows a common area;

FIG. 14A and FIG. 14B show the data in which contents in the common area are extracted with regard to the abnormal response;

FIG. 15 is a flowchart of a vulnerability diagnostic program stored in a terminal PC 22.

DESCRIPTION OF THE PREFEERED EMBODIMENTS

1. Overview of the Vulnerability Diagnostic Device

Figure 3:
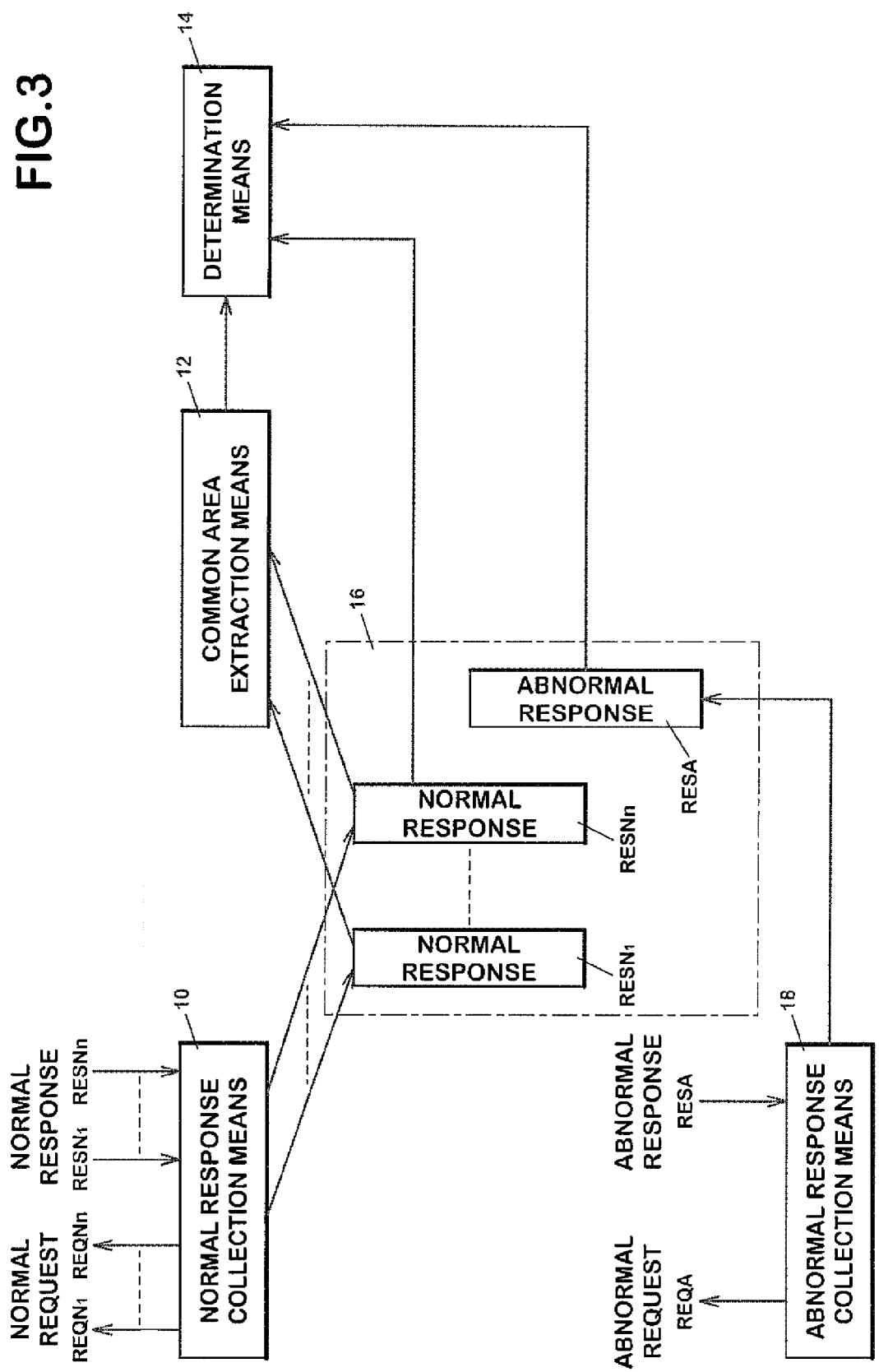
FIG. 3 is a functional block diagram of a vulnerability diagnostic device according to one embodiment.

FIG. 3 shows a functional block diagram of a vulnerability diagnostic device according to one embodiment of the present invention. A normal response collection means 10 makes a request REQN originally expected by a system (referred to as a normal request) to a website to be diagnosed. For example, a normal request REQN with a user ID and a password registered in advance is made. The normal response collection means 10 receives a response RESN to this normal request from a Web server (referred to as a normal response) and stores it to a recording section 16.

In this embodiment, the normal response collection means 10 transmits a plurality of normal requests REQN1 to REQNn and receives to store a plurality of normal responses RESN1 to RESNn to those requests.

An abnormal response collection means 18 makes an aggressive request REQA that the system does not originally expect such as SQL injection (referred to as an abnormal request) to the Web server. The abnormal response collection means receives a response RESA to this abnormal request (referred to as an abnormal response) and stores it to the recording section 16.

A common area extraction means 12 compares the normal responses RESN1 to RESNn stored in the recording section 16 and extracts an area in which the contents of the responses are common.

A determination means 14 determines whether the normal response is identical with the abnormal response or not for the extracted common area as a target. The determination means determines that there is no vulnerability to attacks when the uniformity is not found and that there is vulnerability to attacks when the uniformity is found. As described above, the vulnerability to attacks such as SQL injection can be diagnosed.

2. Hardware Configuration

Figure 4:
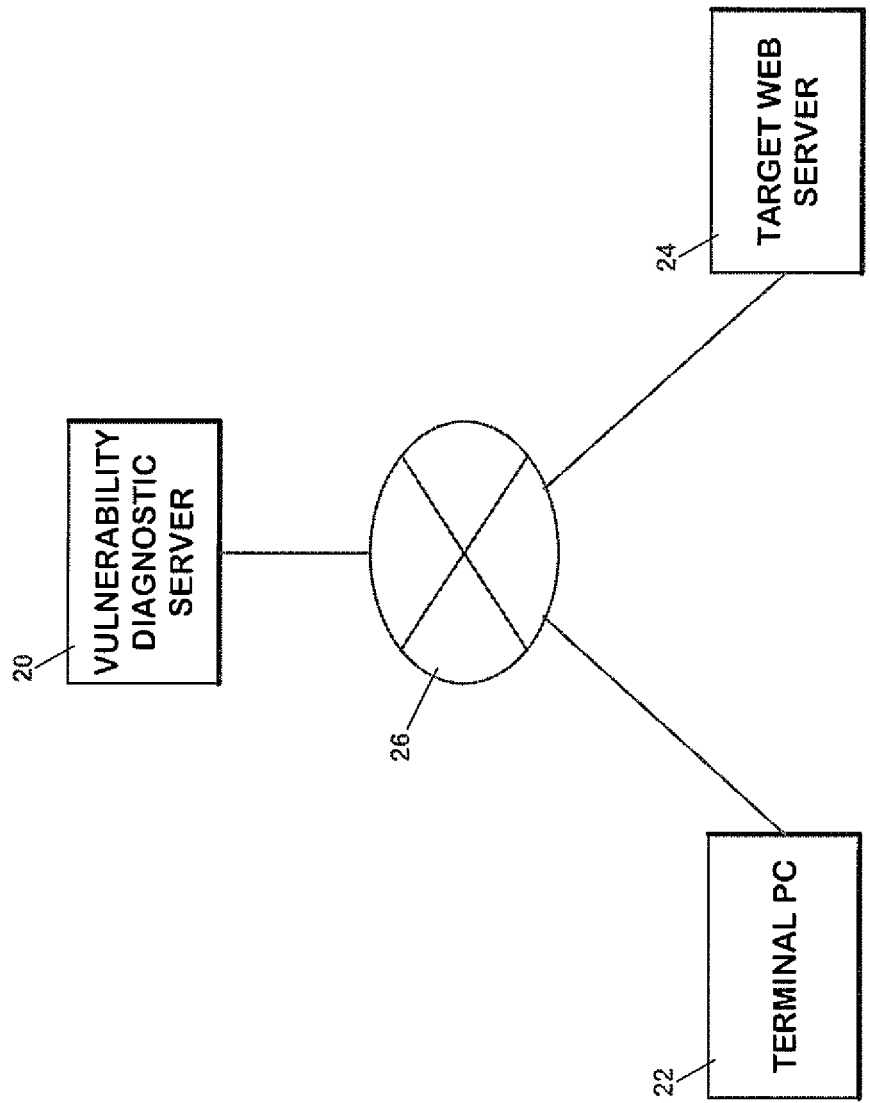
FIG. 4 is a diagram that illustrates a system configuration using a vulnerability diagnostic server 20.

FIG. 4 shows a system configuration when the vulnerability diagnostic device is configured as a server. In this system, the vulnerability diagnostic device is configured as a vulnerability diagnostic server 20. A target Web server 24 is a Web server subject to the vulnerability diagnosis. A terminal PC 22 is a terminal device that is operated by a user who desires to perform the vulnerability diagnosis for the target Web server 24.

All of the vulnerability diagnostic server 20, the terminal PC 22, and the target Web server 24 are connected to the Internet and can communicate mutually.

Figure 5:
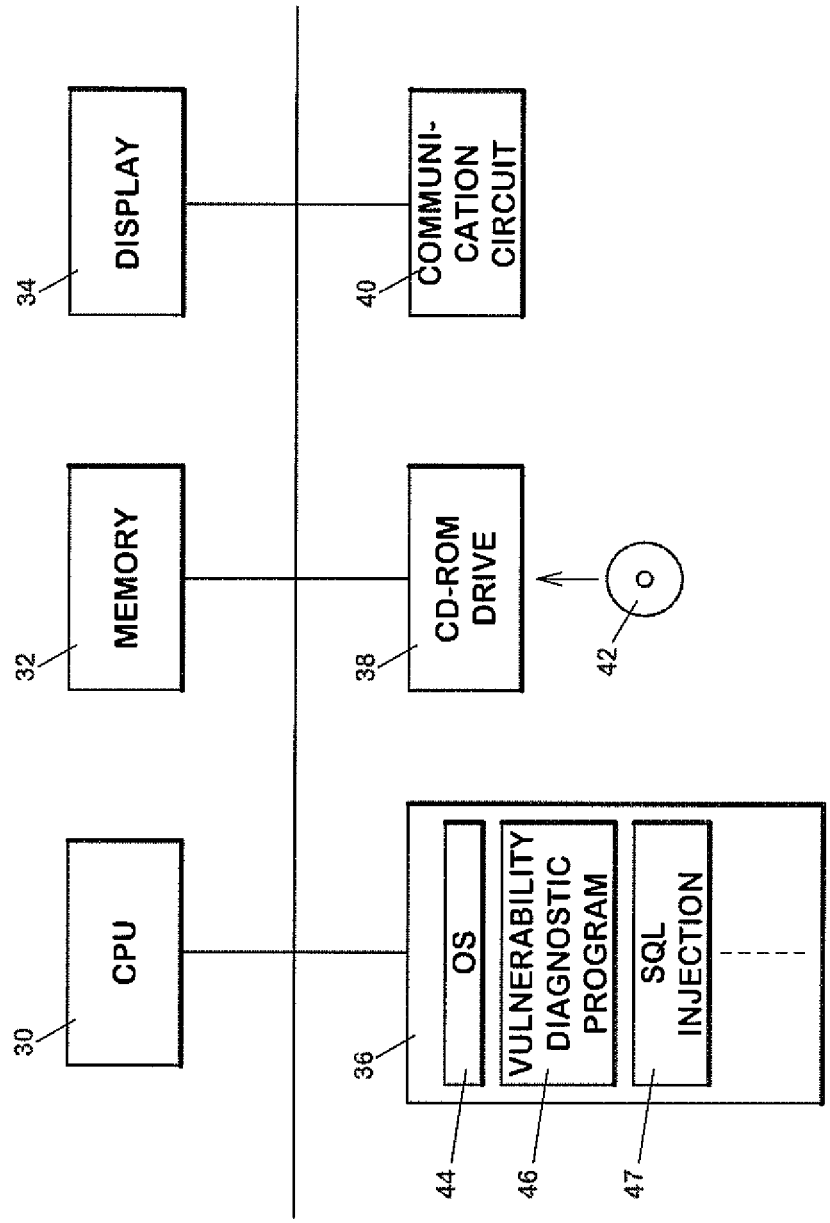
FIG. 5 shows a hardware configuration of the vulnerability diagnostic server 20.

FIG. 5 shows a hardware configuration of the vulnerability diagnostic server 20. A CPU 30 is connected to a memory 32, a display 34, a hard disk 36, a CD-ROM drive 38, and a communication circuit 40.

The hard disk 36 stores an operating system (for example, Microsoft Windows (trade mark)) 44, a vulnerability diagnostic program 46, and SQL injection 47. The vulnerability diagnostic program 46 cooperates with the operating system 44 to perform its function. The SQL injection 47 stores a predetermined attack including, for example, a random user ID and an entry of the password as "'OR'A'='A" as described above.

Both of the operating system 44 and the vulnerability diagnostic program 46 are recorded on a CD-ROM 42 and installed onto the hard disk 36 through the CD-ROM drive 38. The communication circuit 40 is a circuit for communicating with other computers through the Internet 26.

3. Flowchart for Vulnerability Diagnostic Program

Figure 6:
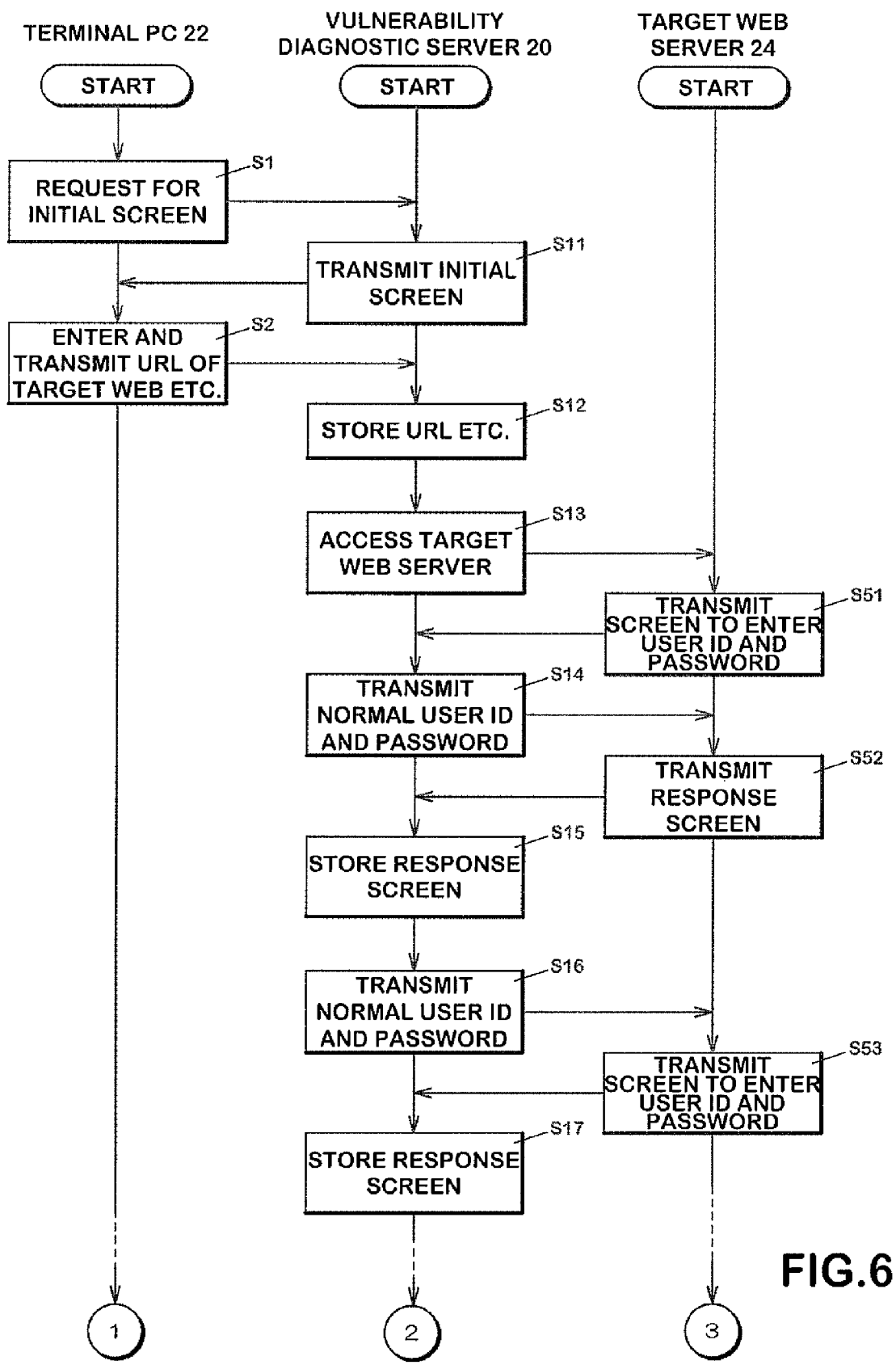
FIG. 6 is a flowchart of a vulnerability diagnostic program 46.
Figure 7:
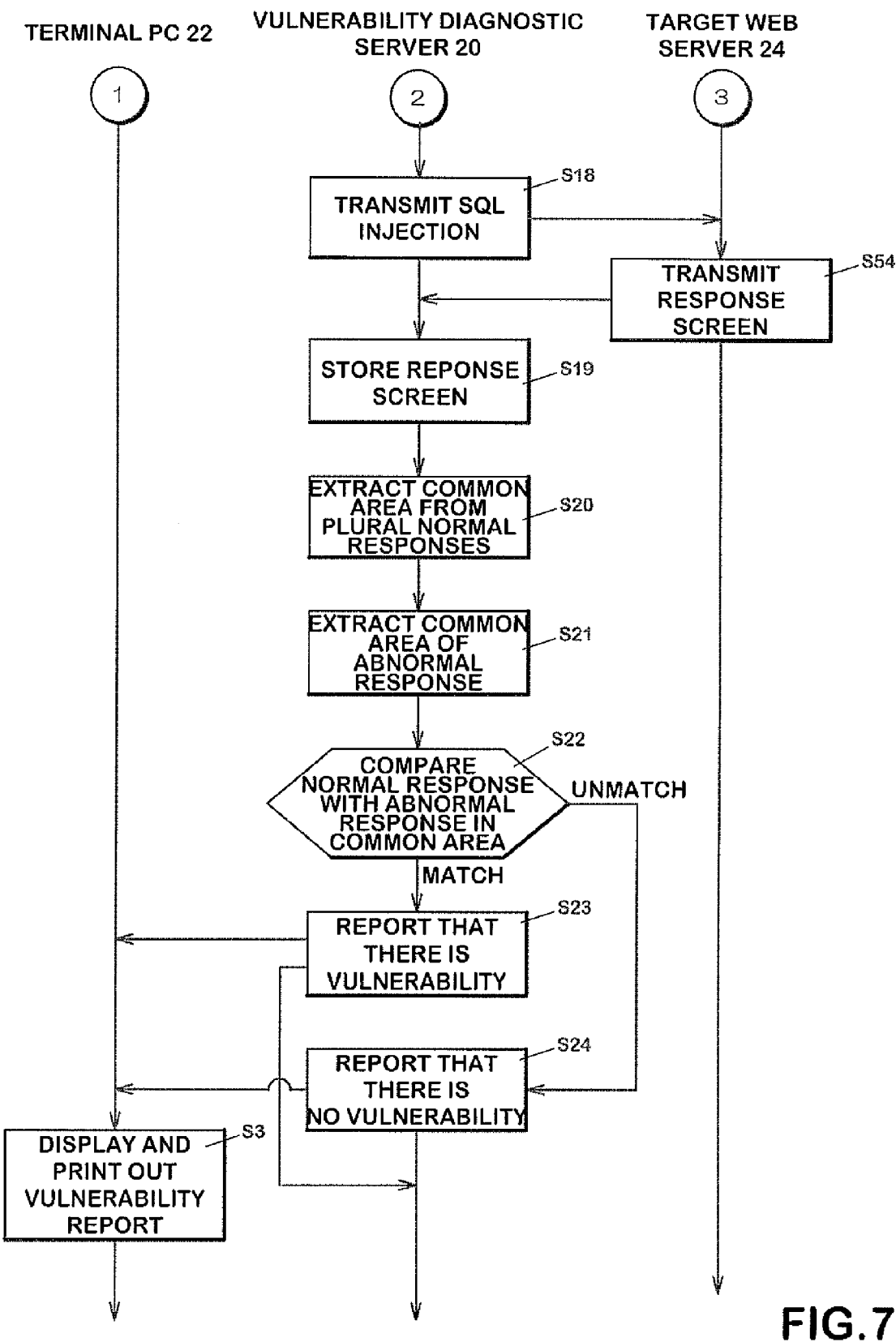
FIG. 7 is a flowchart of the vulnerability diagnostic program 46.

FIG. 6 shows a flowchart of a vulnerability diagnostic program 46. Flowcharts of a browser program of the terminal PC 22 and a server program of the target Web server 24 are also shown.

Figure 8:
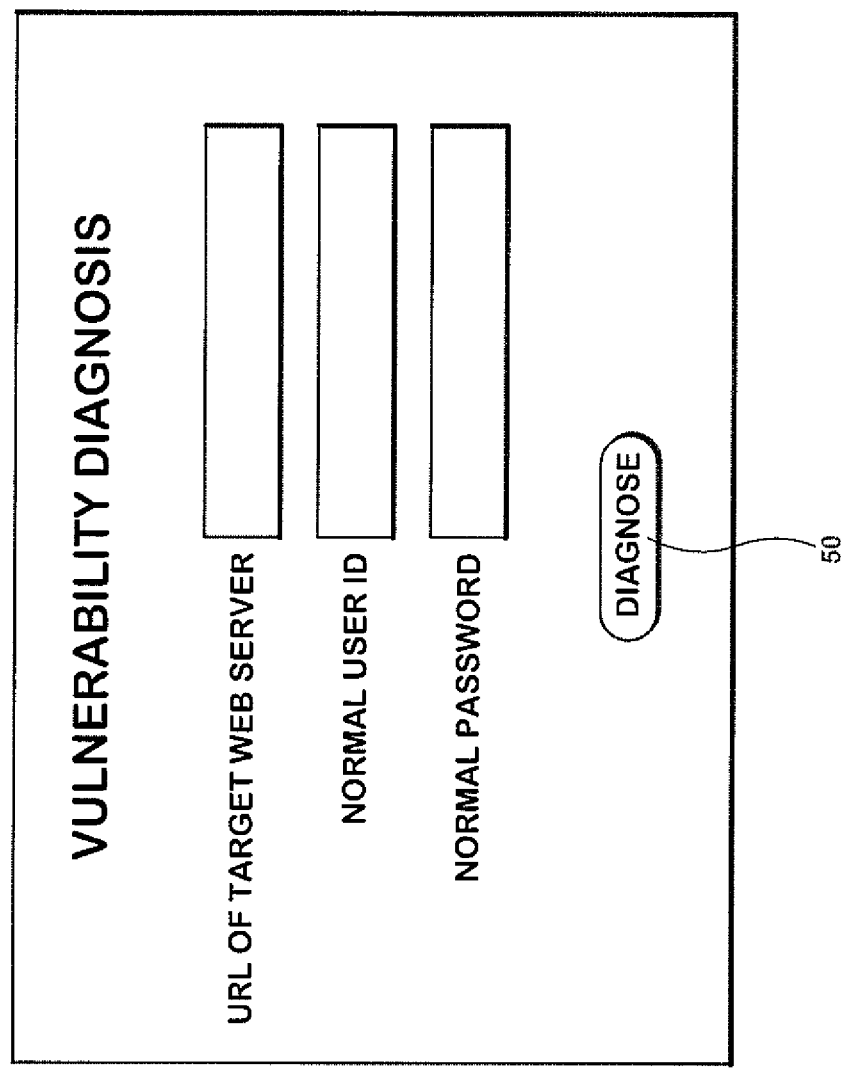
FIG. 8 is a diagram that illustrates an entry screen for a vulnerability diagnosis.

The terminal PC 22 makes access to the vulnerability diagnostic server 20 and a request for an initial screen (Step S1). In response to this, a CPU 30 of the vulnerability diagnostic server 20 transmits the initial screen to the terminal PC 22 (Step S11). For example, the initial screen as shown in FIG. 8 is transmitted to the terminal PC 22 and displayed on the terminal PC 22.

A user sees the initial screen and operates the terminal PC 22 to enter a URL of the target Web server 24 wishing to diagnose. The user also enters a normal user ID and password (Step S2). For example, the user enters the user ID as an administrator and the password as an administrator and transmits to the vulnerability diagnostic server 20.

The CPU 30 of the received vulnerability diagnostic server 20 stores the URL of the target Web server 24, the normal user ID, and the password on the hard disk 36 (Step S12). The CPU 30 of the received vulnerability diagnostic server 20 makes access to the target Web server according to the stored URL of the target Web server 24 (Step S13).

Figure 1:
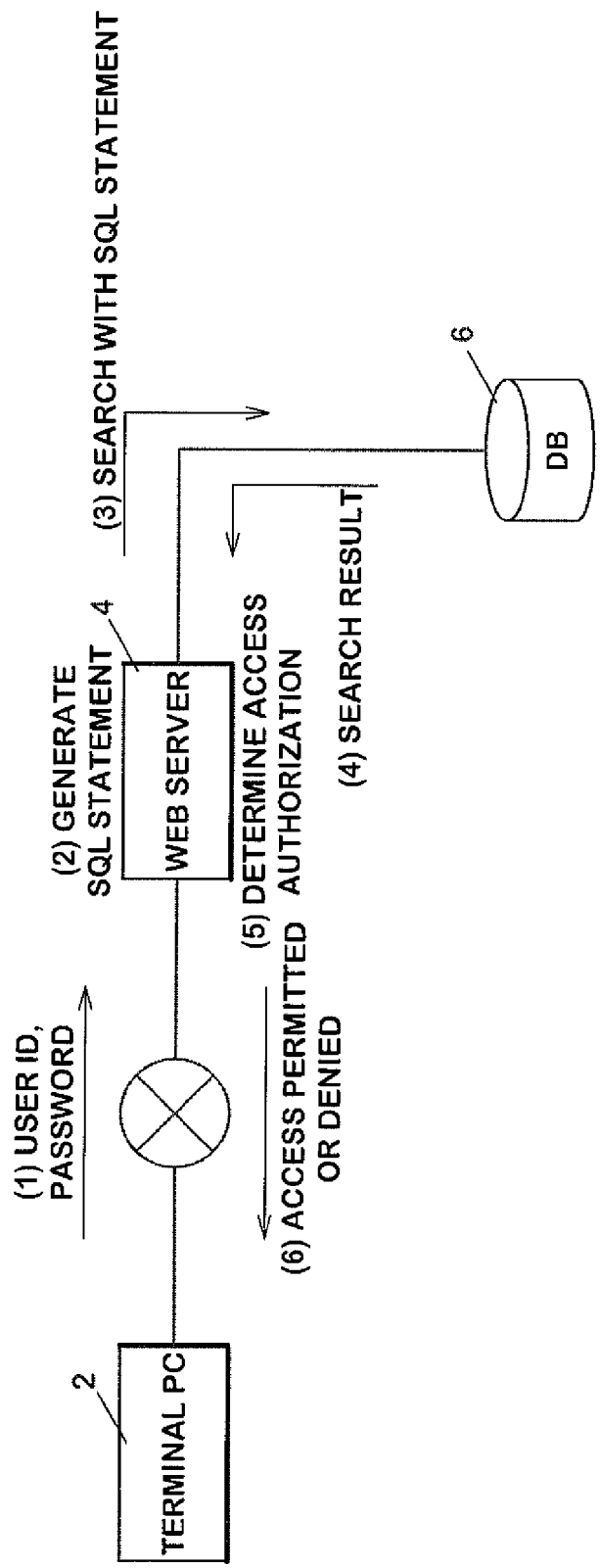
FIG. 1 is a diagram that schematically illustrates a mechanism of authentication in a Web server device.
Figure 2:
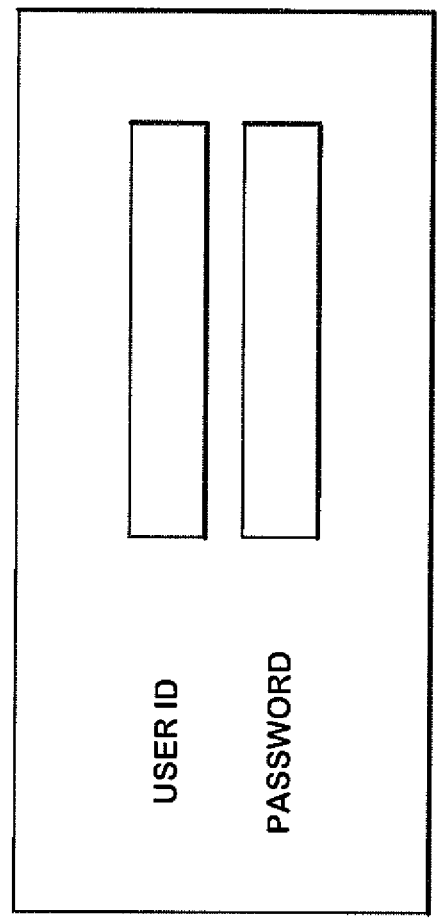
FIG. 2 is a diagram that illustrates an entry screen of a user ID and a password in the authentication.

The target Web server 24 responds to the above step and returns an authentication screen that requires the entry of the user ID and the password (Step S51). For example, the screen as shown in FIG. 2 is returned to the vulnerability diagnostic server 20.

In response to this, the CPU 30 of the vulnerability diagnostic server 20 transmits the stored normal user ID and password to the target Web server 24 (Step S14). In other words, the normal request is transmitted to the target Web server 24.

In response to this, the target Web server 24 returns a response to the normal request (normal response) RESN1 to the vulnerability diagnostic server 20 (Step S52). The CPU 30 of the vulnerability diagnostic server 20 stores the data of the normal response RESN1 on the hard disk 36 (Step S15). FIG. 9 shows the data of the normal response RESN1. In addition, FIG. 10 shows screen displays when the normal response RESN1 is displayed.

Furthermore, the CPU 30 of the vulnerability diagnostic server 20 transmits a second normal request to the target Web server 24 according to the stored normal user ID and password (Step S16).

In response to this, the target Web server 24 returns a response to the second normal request (normal response) RESN2 to the vulnerability diagnostic server 20 (Step S53). The CPU 30 of the vulnerability diagnostic server 20 stores the data of the normal response RESN2 on the hard disk 36 (Step S17). FIG. 9 shows the data of the normal response RESN2. In addition, FIG. 10 shows screen displays when the normal response RESN2 is displayed.

The CPU 30 of the vulnerability diagnostic server 20 repeats the processing of the aforementioned steps S14 to S15 a given number of times n and acquires to store the normal responses RESN1 to RESNn. FIG. 9 only shows the data of the normal responses RESN1 and RESN2; however, the response RESN3 is performed in a similar way. In addition, FIG. 10 only shows screen displays for the normal responses RESN1, RESN2, and RESNn; however, other responses are performed in a similar way.

As seen from FIG. 10, the normal response in this example includes a time display as login time and advertisements, and those change with each request made.

Next, the CPU 30 of the vulnerability diagnostic server 20 reads the SQL injection 47 that is prepared in advance and stored on the hard disk 36 and makes a request (abnormal request) to the diagnosis target Web server 24 with the SQL injection (Step S18).

In response to this, the target Web server 24 returns a response to the abnormal request (abnormal response) RESA to the vulnerability diagnostic server 20 (Step S54). The CPU 30 of the vulnerability diagnostic server 20 stores the data of the abnormal response RESA on the hard disk 36 (Step S19).

Figure 12A:
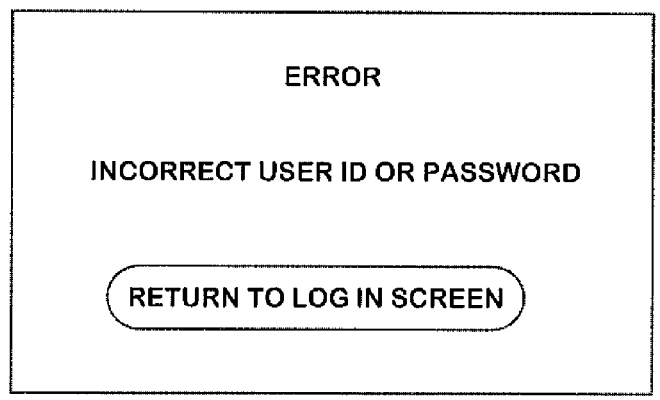
FIG. 12A and FIG. 12B show screen displays corresponding to the data of the abnormal response RESA of FIG. 11.

At that time, if the target Web server 24 does not permit the access against the attack with the SQL injection 47 (that is to say, if the server does not have the vulnerability), the server returns the abnormal response RESA as shown in FIG. 11A. FIG. 12A shows a screen display corresponding to the abnormal response RESA.

Figure 12B:
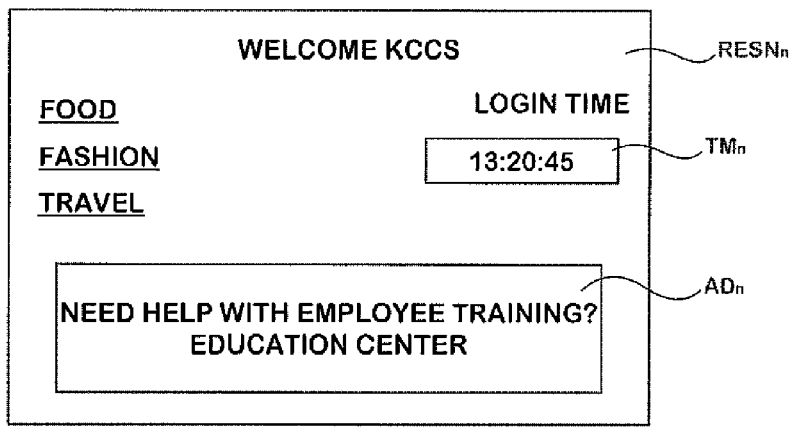

On the other hand, if the target Web server 24 permits the access against the attack with the SQL injection 47 (that is to say, if the server has the vulnerability), the server returns the abnormal response RESA as shown in FIG. 11B. FIG. 12B shows a screen display corresponding to the abnormal response RESA.

Next, the CPU 30 of the vulnerability diagnostic server 20 compares the data of the normal responses RESN1, RESN2, . . . , RESNn stored on the hard disk 36 and extracts a common area of the contents (Step S20).

For example, the normal responses RESN1, RESN2, . . . , RESNn as shown in FIG. 9 include different sections of clock displays TM1, TM2, . . . That is because the description returned from the target Web server 24 varies according to the access time. In addition, advertisement display sections AD1, AD2, . . . differ. That is because a hyperlink destination of the advertisement returned from the target Web server 24 varies each time the access is made. Those sections correspond to sections of time displays TM1, TM2, . . . , TMn and advertisement displays AD1, AD2, . . . , ADn with reference to FIG. 10.

Therefore, the CPU 30 of the vulnerability diagnostic server 20 extracts the sections other than the time displays TM1, TM2, . . . and the advertisement displays AD1, AD2, . . . in the normal responses of FIG. 9 as common areas. For example, as shown in FIG. 13, the area other than the symbols * * * * (first to ninth lines and twelfth line) are extracted as the common area.

The CPU 30 of the vulnerability diagnostic server 20 stores the details in which the common area includes the first to ninth lines and the twelfth line and the contents of the normal response in the area are those shown in FIG. 13 on the hard disk 36.

Next, the stored abnormal response RESA is read out from the hard disk 36, and the common area is extracted. The common area is the contents of the first to ninth lines and the twelfth line in this case, and therefore the contents as shown in FIG. 14A are retrieved in the case of the abnormal response RESA (in the case where there is no vulnerability) as shown in FIG. 11A.

Then, the CPU 30 of the vulnerability diagnostic server 20 compares the normal response (FIG. 13) with the abnormal response (FIG. 14A) in the common area (step S22). Because the responses are not matched with each other in this case, the process proceeds to Step S24, and the type of the diagnosed SQL injection and a notification that "there is no vulnerability" are sent to the terminal PC 22.

On the other hand, in the case where the abnormal response RESA includes the contents as shown in FIG. 11B, the contents of the common area becomes those as shown in FIG. 14B. When the normal response (FIG. 13) is compared with the abnormal response (FIG. 14B) in the common area (Step S22), the responses are matched with each other. Therefore, the CPU 30 of the vulnerability diagnostic server 20 advances the process to Step S23, and the type of the diagnosed SQL injection and a notification that "there is vulnerability" are sent to the terminal PC 22.

The terminal PC 22 displays (prints out) diagnostic information sent as described above (Step S3).

As described above, the diagnosis of the vulnerability can be performed to the Web server in which display contents vary according to the access time or the number of access.

4. Other Embodiments (1) In the embodiment described above, the diagnosis against SQL injection with regard to the authentication screen by the user ID and the password has been performed. However, the appropriate similar diagnosis can be performed against other SQL injections such as the SQL injection with regard to the entry screen for searching even in the case where the display contents vary according to the access time or the number of access.

(2) The embodiment described above has been described for an example in which the diagnosis is performed against only one type of SQL injection; however, the diagnosis may be performed against plural types of SQL injection, and the diagnostic information may be sent to the terminal PC 22.

(3) In the embodiment described above, the diagnosis is performed against the attack with SQL injection. However, the present invention is applicable against other attacks.

Figure 16:
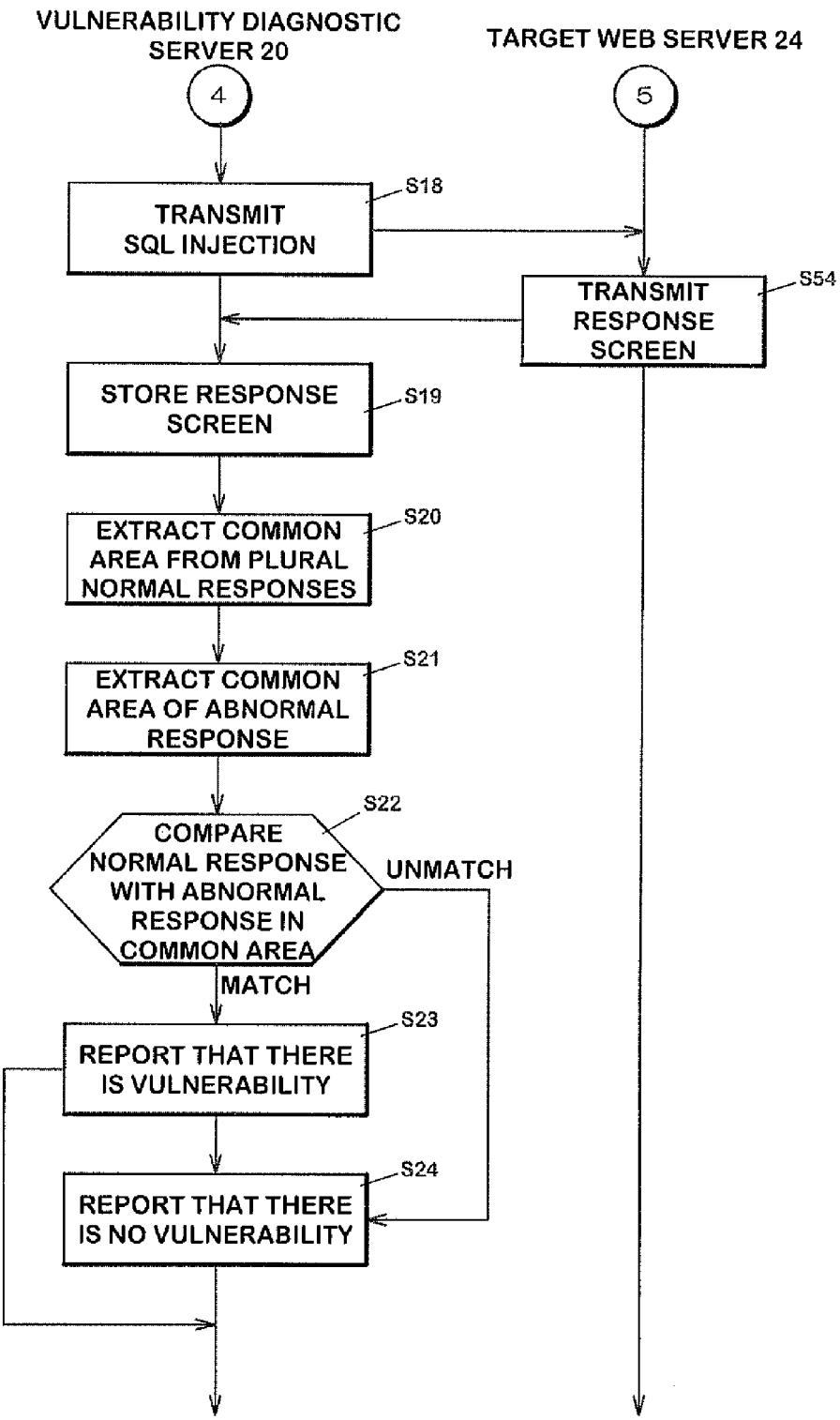
FIG. 16 is a flowchart of the vulnerability diagnostic program stored in the terminal PC 22.

(4) In the embodiment described above, the access is made from the terminal PC 22 operated by the user to the vulnerability diagnostic server 20, and the diagnosis of the target Web server 24 is performed. However, the vulnerability diagnostic program 46 may be installed in the terminal PC 22, and the diagnosis of the target Web server 24 may be performed from the terminal PC 22. FIG. 15 and FIG. 16 show the flowchart of the vulnerability diagnostic program 46 in the above case.

What is claimed is:

1. A vulnerability diagnostic device for diagnosing whether a Web server has vulnerability to an attack or not, comprising:

a normal response collection means for transmitting a plurality of normal requests to a diagnosis target Web server and receiving a plurality of normal responses in response to each normal request to store it in a recording section;

a common area extraction means for extracting a common area from the contents of the plurality of normal responses, wherein the contents in the common area of the plurality of normal responses have no variation according to the plurality of normal responses stored in the recording section, wherein contents not in the common area include at least one of content that varies with access time or content that varies with a number of access times;

an abnormal response collection means for transmitting an abnormal request to the diagnosis target Web server and receiving an abnormal response in response to the abnormal request to store it in the recording section; and a determination means for comparing contents of the extracted common area of the normal response with common area contents of the abnormal response, determining whether there is a difference between the responses or not, and determining absence of vulnerability when there is the difference or presence of vulnerability when there is not the difference.

2. A vulnerability diagnostic program stored on a non transitory computer readable medium for realizing a vulnerability diagnostic device for diagnosing whether a Web server has vulnerability to attack or not by a computer, wherein the computer is made to function as:

a normal response collection means for transmitting a plurality of normal requests to a diagnosis target Web server and receiving a plurality of normal responses in response to each normal request to store it in a recording section;

a common area extraction means for extracting a common area from the contents of the plurality of normal responses, wherein the contents in the common area of the plurality of normal responses have no variation according to the plurality of normal responses stored in the recording section, wherein contents not in the common area include at least one of content that varies with access time or content that varies with a number of access times;

an abnormal response collection means for transmitting an abnormal request to the diagnosis target Web server and receiving an abnormal response in response to the abnormal request to store it in the recording section; and a determination means for comparing contents of the extracted common area of the normal response with common area contents of the abnormal response, determining whether there is a difference between the responses or not, and determining absence of vulnerability when there is the difference or presence of vulnerability when there is not the difference.

3. The vulnerability diagnostic program according to claim 2, wherein the abnormal request is a request for performing SQL injection.

4. The vulnerability diagnostic program, wherein the vulnerability diagnostic device realized by the vulnerability diagnostic program according to claim 2 is configured as a server device, and the normal response collection means collects the normal responses according to a URL of the diagnosis target Web server and information regarding the normal requests transmitted from a terminal device through a network.

5. A vulnerability diagnostic method of executing a vulnerability diagnostic device for diagnosing whether a Web server has vulnerability to an attack or not by a computer, the method comprising:

transmitting a plurality of normal requests to a diagnosis target Web server and receiving a plurality of normal responses in response to each normal request to store it in a recording section;

extracting a common area from the contents of the plurality of normal responses, wherein the contents in the common area of the plurality of normal responses have no variation according to the plurality of normal responses stored in the recording section, wherein contents not in the common area include at least one of content that varies with access time or content that varies with a number of access times;

transmitting an abnormal request to the diagnosis target Web server and receiving an abnormal response in response to the abnormal request to store it in the recording section; and comparing contents of the extracted common area of the normal response with common area contents of the abnormal response, determining whether there is a difference between the responses or not, and determining absence of vulnerability when there is the difference or presence of vulnerability when there is not the difference.

6. The vulnerability diagnostic program, wherein the vulnerability diagnostic device realized by the vulnerability diagnostic program according to claim 3 is configured as a server device, and the normal response collection means collects the normal responses according to a URL of the diagnosis target Web server and information regarding the normal requests transmitted from a terminal device through a network.

* * * * *